Figure 1:
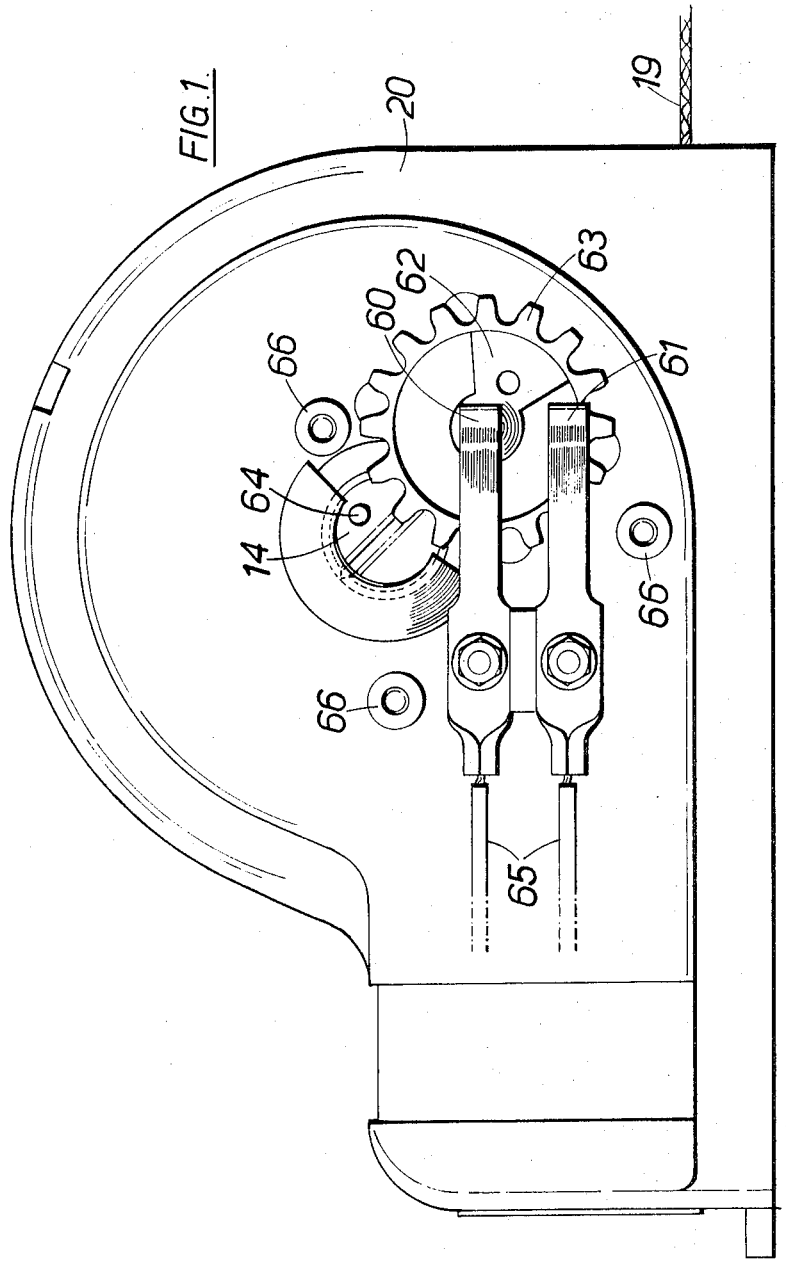

United States Patent [19]
Sargeant

[11] 3,830,444
[45] Aug. 20, 1974

[54] SAFETY SEAT BELT ASSEMBLIES
[75] Inventor: Archibald Sargeant, Felpham, England
[73] Assignee: Wingard Limited, Chichester, Sussex, England
[22] Filed: Mar. 15, 1972
[21] Appl. No.: 234,938

[30] Foreign Application Priority Data
Apr. 15, 1971 Great Britain...................... 9464/71

[52] U.S. Cl..... 242/107.4, 200/61.15, 200/61.58 B, 340/52 E
[51] Int. Cl....................... A62b 35/00, B65h 63/08
[58] Field of Search.................. 242/107.4, 107.5 B; 280/150.5 B; 297/386, 387, 388; 340/52, 52 E, 278; 200/61.15, 61.16, 153 P, 23, 24, 61.58 B; 307/105 B; 180/82 C

[56] References Cited
UNITED STATES PATENTS

| | | | |
|---|---|---|---|
| 3,015,705 | 1/1962 | Dull | 200/153 P |
| 3,200,370 | 8/1965 | Rush | 200/61.58 B |
| 3,345,472 | 10/1967 | Kuhlman | 200/26 |
| 3,504,336 | 3/1970 | Boblitz | 242/107.4 |
| 3,506,305 | 4/1970 | Eineman | 242/107 R |
| 3,632,059 | 11/1972 | Loose | 242/107.4 |
| 3,635,420 | 1/1972 | Romanzi | 242/107.4 |
| 3,664,600 | 5/1972 | Sargeant | 242/107.4 |
| 3,667,698 | 6/1972 | Fisher | 242/107.4 |
| 3,693,147 | 9/1972 | Seo et al. | 340/278 |

Primary Examiner—John W. Huckert
Assistant Examiner—Jon W. Henry
Attorney, Agent, or Firm—Scrivener Parker Scrivener & Clarke

[57] ABSTRACT

An automatic retractor for a vehicle seat belt incorporates means to lock the reel against belt withdrawal in the event of an accident and an electrical switch which is controlled by the length of belt withdrawn from the reel. The switch is adapted to be connected into a circuit which warns the driver that the belt is not in use.

5 Claims, 7 Drawing Figures

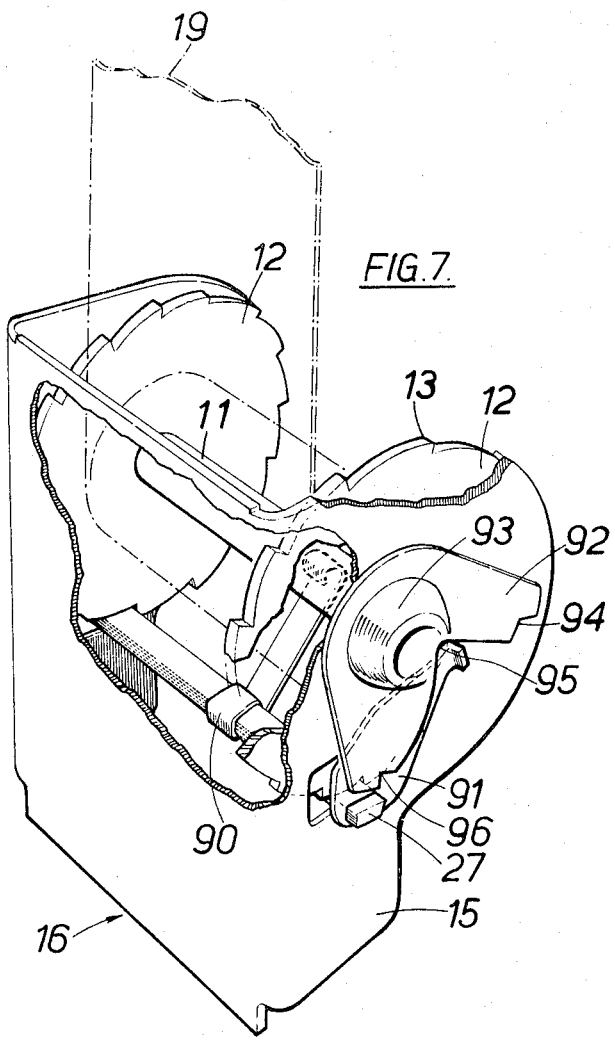

SAFETY SEAT BELT ASSEMBLIES

This invention relates to automatic retractors for safety seat belt assemblies for vehicles.

To avoid the inconvenience caused by loose lengths of webbing to persons entering or leaving a car it is common practice to attach one end of a length of webbing to an automatic retractor incorporating a spring-loaded reel on which the webbing is wound when it is not under tension. However, when the seat belt is in use the reel must lock to prevent webbing being drawn from it so that the occupant of the seat is held against being thrown forwards in the event of an accident.

In some retractors rotation of the reel is controlled by means allowing webbing to be drawn off slowly but locking in the event of a sudden snatch, and it is also known to control locking mechanism by a pendulum, rolling ball or other inertia-sensitive device.

Such locking means however only come into operation when the car is subjected to an excessive rate of deceleration and might fail when needed.

In another form of retractor the webbing can be drawn freely off the reel for putting on the belt, and when the belt has been fastened and is relieved of tension the reel is automatically locked by means actuated by a small reverse movement of the reel which is effected by its spring-loading.

According to our invention an automatic retractor incorporates a bracket adapted to be fitted to a vehicle, a reel journalled in the bracket and on which webbing is adapted to be wound, a spring biassing the reel in the direction of webbing retraction, a ratchet disc on the reel, a pawl lever rockably mounted on the bracket for engagement with the ratchet disc to lock the reel against webbing withdrawal, means to operate the pawl lever, a control member movable relative to the bracket by rotation of the reel, and an electrical switch controlled by said control member, the control member being movable between a first position where the switch is closed and a second position where the switch is open, the movement between the two positions corresponding to a predetermined number of revolutions of the reel.

Preferably the switch includes two fixed contacts and a switch member angularly movable by the control member to open and close the switch. The switch member may form part of the control member or may be actuated by the control member.

The switch may energise a visual or audible warning and the switch may be arranged in series with the ignition switch of the vehicle, with a pressure switch closed when the seat is occupied, or with any other switch which has to operate before the vehicle can move off.

Initially, when the person using the retractor occupies his seat, the webbing is fully wound, the operating means holds the pawl lever out of engagement with the ratchet disc and the control member is in its first position so that the warning is energised. As the occupant draws the webbing off the reel preparatory to putting it on, the control member is moved by the reel towards the second position. When the occupant has withdrawn sufficient webbing to fasten it by engaging the two parts of a buckle of any convenient type, the control member will have reached its second position allowing the switch to open and discontinue the warning.

The operating means for the pawl lever may include an inertia sensitive device or a device sensitive to a reverse movement of the reel effected by the spring.

Figure 2:
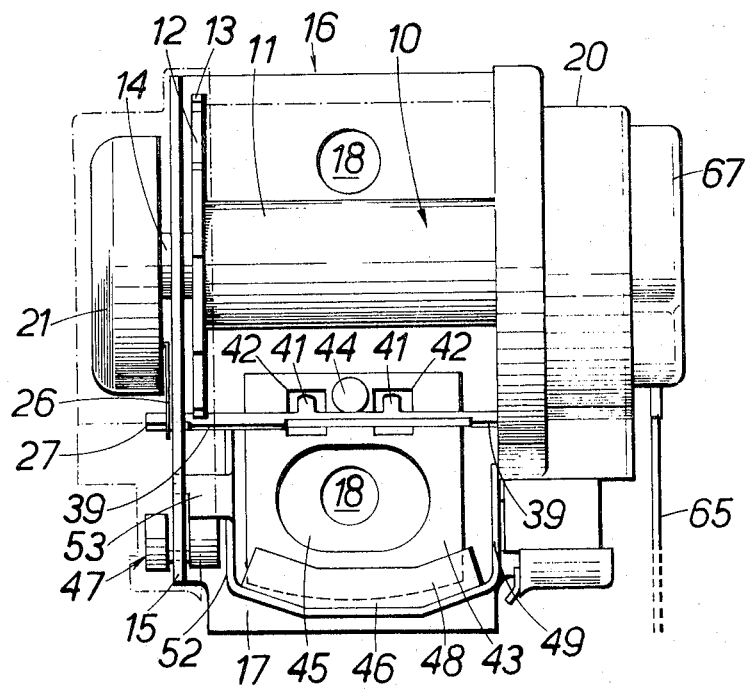
Figure 3:
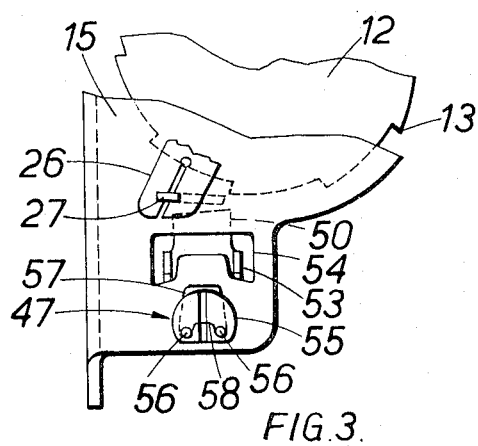
Figure 4:
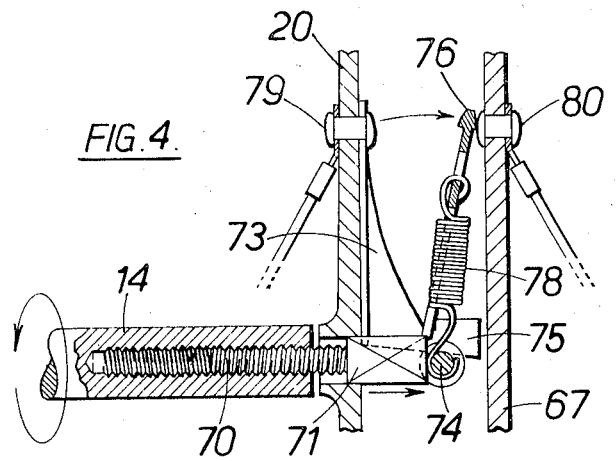
Figure 5:
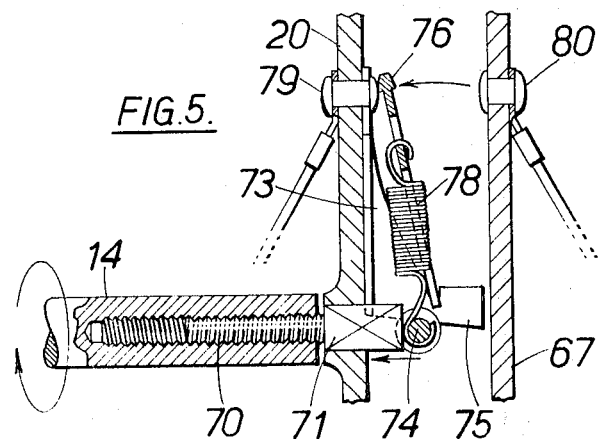
Figure 6:
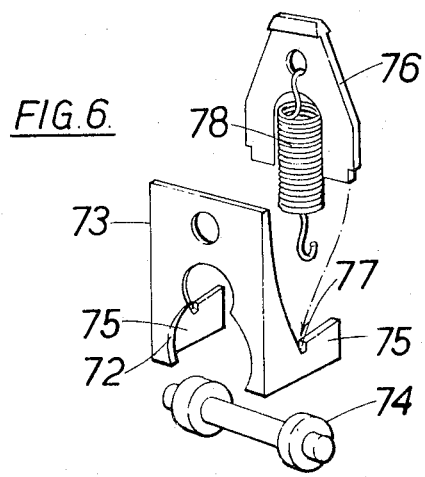

Several embodiments of an automatic retractor according to the invention are described with reference to the accompanying drawings, in which FIG. 1 is a view of one side of a retractor showing a switch, FIG. 2 is a plan view of the retractor in FIG. 1 with the switch covered, FIG. 3 is a view of part of the opposite side of the retractor shown in FIG. 1, FIGS. 4 and 5 are sectional views of a second form of switch for use in a retractor, FIG. 6 is an exploded perspective view of parts of the switch shown in FIGS. 4 and 5, and FIG. 7 is a partially broken away perspective view of a second embodiment of the retractor.

Referring to FIGS. 1 to 3 the reel 10 comprises a hub 11 having a disc 12 at each end, the periphery of each disc being serrated to form ratchet teeth 13 so that the discs 12 serve not only as guides for the webbing wound on to the hub 11 but also as part of a reel locking mechanism. The hub 11 is keyed onto a spindle 14 each end of which is rotatably mounted in an upstanding side flange 15 of an elongated channel section bracket 16. The spindle 14 is mounted at one end of the bracket 16 and at this end the flanges 15 are contoured to the diameter of the ratchet discs 12. The base 17 of the bracket 16 is formed with two holes 18 for bolts or screws which are adapted to fasten the bracket to the base of a pillar of a motor vehicle. Preferably the bracket being fastened vertically with the reel spindle 14 parallel to the longitudinal axis of the vehicle and with the reel uppermost so that the free end of the webbing 19 is directed upwardly.

The reel spindle 14 projects through both side flanges 15. The spring for biassing the reel in the direction of belt retraction is mounted on one end of the spindle 14 and is contained in a housing 20. On the other end of the spindle 14 is mounted an inertia sensitive device 21 which is triggered by a threshold acceleration of reel rotation in the direction of belt withdrawal. This belt sensitive device 21 actuates a lever 26 attached to a pawl lever 27.

The pawl lever 27 is a bar mounted below the ratchet discs 12 of the reel 10 in slots in the side flanges 15 of the bracket 16. The pawl lever 27 has two outwardly projecting pawls 39 which are adapted to engage the ratchet teeth 13 when the bar is rocked towards the reel 10. Once the pawls 39 have engaged the ratchet teeth 13, tension on the belt will keep the pawls engaged and the reel locked. When the tension is released the reel is free to retract the belt, the pawls 39 riding over the teeth 13. In a modification (not shown) a light spring is fitted to the pawl lever 27 to bias it away from the ratchet teeth 13.

The pawl lever 27 is also provided with a pair of inwardly projecting lugs 41 which engage in holes 42 in a bob weight 43 that forms a second operating means for the pawl lever and is sensitive to a longitudinal acceleration or a longitudinal tilt of the vehicle. The bob weight 43 is a flat plate that is pivoted about a rivet 44 set in the base 17 of the bracket 16 substantially in line with the pawl lever 27. The pivot point in the bob weight 43 is at the centre of the upper side between the two holes 42 which engage the lugs 41 so that the bob weight hangs against the base of the bracket 16 and is free to swing like a pendulum. A central portion 45 of the bob weight 43 is cut away to allow the bob weight to swing without fouling the head of the bolt or screw which is adapted to fasten to the vehicle.

Normally the bob weight 43 hangs centrally in the bracket but on acceleration of the vehicle, it swings to one side and the upper edge of one of the holes 42 exerts a downwards force on its corresponding lug 41 thus rocking the pawl lever 27 into its locking position. Similarly the bob weight 43 will lock the reel if the vehicle should climb or descend a steep hill or if the vehicle should be otherwise tilted longitudinally. The reel will remain locked while the belt is under tension or while locking conditions exist but when conditions return to normal, the reel will be free to pay out or retract the belt.

A third operating device for the pawl lever 27 which is sensitive to lateral tilting and lateral accelerations of the vehicle comprises an actuating member 46 acting on the pawl lever 27 to lock the reel 10 and the locking block 47 irreversibly holding the actuating member 46 in the locked position when incipient rolling conditions are reached.

The actuating member 46 is a flat metal strip formed into a U-shaped frame and having a metal weight 48 rivitted on the inside of the base of the U. The end of one arm 49 of the actuating member 46 is provided with a single outwardly cranked lug while the other arm 52 is provided with a pair of outwardly cranked lugs 53 separated by the width of the strip. The free ends of the lugs are reduced and are mounted in the side flanges 15 of the bracket 16 so that the actuating member 46 can pivot about an axis parallel to the reel spindle 14. The pair of lugs 53 are mounted in a downwardly facing U-shaped slot 54, each lug resting in one of the arms of the U. Above these lugs 53 the actuating member is provided with an upwardly projecting extension 50 on which the pawl lever 27 rests when in the unloaded condition.

In operation a lateral tilt or lateral acceleration of the vehicle will cause the actuating member 46 to swing away or towards the base 17 of the bracket 16. In either case the extension 50 of the actuating member will cause the pawl lever 27 to rock into engagement with the ratchet teeth 13. When vehicle conditions return to normal the actuating member 46 will release the locking member 27 unless the locking block 47 has been activated.

The locking block 47 comprises two identical discs 55 each having the shape of a major segment of a circle. The discs 55 are held apart by two pins 56 spaced along the chord of the segment. The locking block 47 is pivoted on these pins 56 in a trapezoidal opening 57 just below the U-shaped slot 54 in which the pivot lugs 53 of the actuating member 46 are mounted. Under normal driving conditions the locking block 47 rests with its pivot pins 56 in the two lower corners of the opening 57, as shown in FIG. 3, and a raised section 58 on the lower side of the opening 57 projects between the two pins 56. When the vehicle is tilted through an angle greater than a predetermined angle, the locking block 47 pivots about one of the pins 56 so that both pins lie on a normally upright side of the opening 57. In moving to this position the inner disc 55 jams under the wider part of one of the pivot lugs 53 of the actuating member 46, thus holding the extension 50 in the locked position. Even if the vehicle returns to its vertical position, the interaction of the locking block 47 and the actuating member 46 prevent either component returning to its normal position; they can only be released manually. Therefore the actuating member 46 will reversibly lock the reel for degrees of lateral tilt below the predetermined value but when this value has been exceeded, the locking block 47 will pivot and lock the reel irreversibly. It will be understood that by adjusting the geometry and loadings on the mechanism, the conditions which trigger the actuating member 46 initially and which trigger the locking block 47 can be altered as desired.

The reel will normally be fitted with a housing, shown ghosted in FIG. 2, so that when the locking block 47 has been activated in an accident situation the cover will have to be removed before the locking block can be reset.

In FIG. 1 is shown a switch mounted on the housing 20. The switch comprises two contacts 60, 61 fixed one above the other on the housing 20 and a switch member 62 in the form of a sector-shaped metal plate fitted to a gear wheel 63 rotatably mounted on the housing 20. The upper contact 60 is sprung into permanent rubbing engagement with the central part of the switch member 62 and the lower contact 61 engages the peripheral part of the switch member 62 in a range of angular positions of the gear wheel 63. A pin 64 in the end of spindle 14 projects through the housing 20 and is adapted to engage the teeth of gear wheel 63 to rotate the gear wheel one step for each revolution of the reel 10. As shown a substantial length of webbing 19 is withdrawn and the switch is open. When the webbing is retracted by the spring the gear wheel 63 is rotated counter-clockwise to connect contacts 60, 61 and close the switch. The included angle of the sector 62 is chosen so that the switch remains closed until an appreciable amount of webbing has been withdrawn.

The gear wheel 63 may be moulded from plastics material. The leads 65 attached to the contacts 60, 61 are adapted to be connected to a warning device, for example an illuminated panel bearing the wording 'Fasten Seat Belts,' and it may be combined with a bell, horn or other audible warning. Tapped bosses 66 on the housing are adapted to receive screws for holding in place a cover 67, shown in FIG. 2.

A different form of switch is shown in FIGS. 4 to 6. One end of the spindle 14 is tapped to receive a control member in the form of a screw 70 having a rectangular head 71 which is moveable through a complementarily shaped opening in the housing 20 on rotation of the spindle 14. The head 71 also extends through a slot 72 in the web of a mounting 73 rivetted to the housing; the head 71 bearing on a roller 74 guided on the inclined lower edges of spaced end flanges 75 of the mounting 73. A switch member 76 in the form of a plate is mounted to rock in notches 77 in the upper edges of flanges 76. The switch member 76 is retained in the notches 77 by a tension spring 78 extending between the upper end portion of the plate and the roller 74. The upper end of the switch member 76 is adapted to rock into engagement with a contact 79 fixed to the housing 20 and with engagement with a second contact 80 fixed to the cover 67.

In FIG. 4 the switch is shown closed, the contact 79 and 80 being connected by the switch member 76 through the mounting 73. As the webbing is withdrawn from the reel the spindle rotates in the direction shown in FIG. 5 retracting screw 70 and head 71. This allows roller 74 to ride up the flanges 75 under the action of spring 78 until an over-centre position is reached when the switch member 76 rocks over to contact 79 opening the switch. When the webbing is retracted the spindle 14 rotates in the direction shown in FIG. 4 and the head 71 of the screw 70 forces the roller 74 down the guide flanges 75 to close the switch. The geometry of the switch is arranged so that a predetermined number of revolutions of the spindle is required to open the switch.

A second embodiment of the retractor with which a warning switch may be used is shown in FIG. 7. As in the embodiment of FIGS. 1 to 3 the reel 10 comprising hub 11 and ratchet discs 12 is rotatably mounted in the bracket 16 and pawl lever 27 is rockably mounted in the side flanges 15 of the bracket 16 for engagement with teeth 13 on the ratchet discs 12. The reel return spring and switch are mounted on the remote side of the retractor and are not visible in FIG. 7. The pawl lever 27 is held out of engagement with the teeth 13 when the webbing 19 is fully wound on the reel by a follower 90 which bears on the webbing on he reel. One end of an operating lever 91 is attached to the exposed end of pawl lever 27, the other end of lever 91 being adapted to engage a cam plate 92 which is connected to the reel spindle 14 through a spring-loaded slipping clutch 93.

When the webbing 19 is fully wound on the reel the pawl lever is held inoperative by the follower 90. After a substantial length of webbing has been withdrawn, the follower 90 bears on a coil of webbing of smaller diameter and does not prevent the pawl lever from operating but a notch 94 in the cam plate 92 engages the operating lever 91 holding the pawl lever 27 inoperative. When the wearer of the webbing has engaged the buckle and released the webbing any surplus is drawn back on to the reel under the action of the reel return spring. In this movement of the reel the cam plate 92 is moved angularly anti-clockwise into the position shown in FIG. 7 and allows the operating lever 91 to move into a slot 95 at the root diameter of the cam plate, thus allowing the pawl lever 27 to engage ratchet teeth 13 to prevent any further withdrawal of the webbing 19. When the buckle is disconnected and the webbing released, the reel rewinds the webbing taking cam plate 92 further in the anti-clockwise direction until operating lever 91 engages in a second notch 96. This engagement holds the pawl lever 29 away from the ratchet teeth 13 and prevents noisy chattering.

I claim:

1. An automatic retractor incorporating a bracket adapted to be fitted to a vehicle, a reel on which webbing is adapted to be wound and which is mounted on a spindle journalled in said bracket, a spring biassing the reel in the direction of belt retraction, a ratchet disc on the reel, a pawl lever rockably mounted in said bracket for engagement with said ratchet disc to lock the reel against webbing withdrawal, operating means acting on said pawl lever and arranged to bring said pawl lever into engagement with said ratchet disc under predetermined conditions of the reel, an off-centre pin extending axially from one end of said spindle to the outer side of said bracket, a gear wheel having teeth rotatably mounted on the outer side of said bracket, the teeth of said gear wheel being arranged for engagement by said pin, a switch member extending radially from the centre of said gear wheel, a first electrical contact mounted on said bracket to be in permanent contact with said switch member at the centre of said gear wheel, and a second electrical contact mounted on said bracket for contacting a radially outer portion of said switch member, the arrangement being such that the angular movement of said gear wheel and said switch member required to alter the state of the electrical connection between said contacts corresponds to a predetermined number of revolutions of said spindle which corresponds to a predetermined extension of said webbing.

2. A retractor according to claim 1 wherein the operating means for said pawl lever is separate from said switch member and comprises a follower attached to said pawl lever and bearing on the webbing wound on the reel, said follower holding said pawl lever clear of said ratchet disc when the diameter of the webbing on the reel exceeds a predetermined value, an operating lever carried by said pawl lever and moveable between a first position wherein said pawl lever is prevented from engaging said ratchet disc and a second position wherein said pawl lever is engageable with said ratchet disc provided the diameter of said webbing is less than said predetermined value, a cam driven by the reel and engageable with said operating lever upon extension of said webbing, a slipping clutch arranged between the reel and said cam, interengaging stop means on said operating lever and on said cam cooperating with each other to prevent further rotation of said cam with said reel in a web extending direction while simultaneously retaining said pawl lever in its first position, and means automatically disengaging said stop means upon retracting movement of the webbing to enable said pawl lever to move towards its second position.

3. An automatic retractor incorporating a bracket adapted to be fitted to a vehicle a reel on which webbing is adapted to be wound and which is mounted on a spindle journalled in said bracket, a spring mounted on the outer side of one end of said bracket biassing the spindle in the direction of webbing retraction, a casing housing said spring, a ratchet disc on the reel, a pawl lever rockably mounted in said bracket for engagement with said ratchet disc to lock the reel against webbing withdrawal, a follower attached to said pawl lever and adapted to bear on the webbing wound on the reel, said follower holding said pawl lever clear of said ratchet disc when the diameter of the webbing on the reel exceeds a predetermined amount, an operating lever carried by said pawl lever, a cam carried by said spindle on the outer side of the opposite end of said bracket and having a surface cooperating with said operating lever, a slipping clutch arranged between said spindle and said cam, said cam surface determining at least two stable angularly spaced positions for said operating lever, a first position achieved by rotating said cam in the direction of webbing extension in which said pawl lever is held out of engagement with said ratchet disc and a second position achieved by a subsequent rotation of said cam in the opposite direction in which said pawl lever is allowed to engage said ratchet disc provided the diameter is less than said predetermined amount, an off-centre pin extending axially from the end of said spindle on the outer side of said casing, a gear wheel having teeth rotatably mounted on the outer side of said casing, the teeth of said gear wheel being arranged for engagement by said pin, a switch member extending radially from the centre of said gear wheel, a first electrical contact mounted on said casing to be in permanent contact with said switch member at the centre of said gear wheel, and a second electrical contact mounted on said casing for contacting a radially outer portion of said switch member, the arrangement being such that the angular movement of said gear wheel and said switch member required to alter the state of the electrical connection between said contacts corresponds to a predetermined number of revolutions of said spindle which corresponds to a predetermined extension of said webbing.

4. An automatic retractor incorporating a bracket adapted to be fitted to a vehicle, a reel on which seat belt webbing is adapted to be wound and which is mounted on a spindle journalled in said bracket, a spring biassing the reel in the direction of webbing retraction, a ratchet disc on the reel, a pawl lever rockably mounted in said bracket for engagement with said ratchet disc to lock the reel against webbing withdrawal, a follower attached to said pawl lever and adapted to bear on the webbing wound on the reel, said follower holding said pawl lever clear of said ratchet disc when the diameter of the webbing on the reel exceeds a predetermined amount, an operating lever carried by said pawl lever, a cam carried by said spindle and cooperating with said operating lever, a slipping clutch arranged between said spindle and said cam, said cam having three parts determining three stable angularly spaced positions for said operating lever, a first position achieved by rotating said cam in the direction of webbing extension until the first part of the cam acts on said operating lever to move it to its first position wherein said pawl lever is held out of engagement with said ratchet disc, interengaging stop means on the first part of said cam and on the operating lever for preventing further rotation of said cam when said operating lever is in its first position, a second position achieved by a subsequent rotation of said cam in the opposite direction until the second part of the cam acts on said operating lever to move it to its second position wherein said pawl lever is allowed to engage said ratchet disc provided the diameter on the webbing is less than the predetermined amount, and a third position achieved by continued rotation of said cam in the direction of webbing retraction until the third part of the cam acts on said operating lever to move it to its third position wherein said pawl lever is held out of engagement with said ratchet disc, further interengaging stop means on the third part of said cam and on the operating lever for preventing further rotation of said cam in the direction of webbing retraction when said operating lever is in its third position, a control member movable by rotation of said spindle, two electrical contacts mounted on said bracket, and a switch member for connecting and disconnecting said contacts, transmission means for transmitting angular movement from the control member to the switch member to move the switch member between a first position in which it connects said contacts and a second position in which it disconnects said contacts, the arrangement being such that the number of revolutions of said spindle required to cause the angular movement of said switch member between said two positions corresponds to a predetermined extension of the webbing.

5. A retractor according to claim 4 wherein said control member comprises a gear wheel having teeth rotatably mounted on the outer side of said bracket, the teeth of said gear wheel being arranged for engagement by an off-centre pin extending axially from one end of said spindle, and said switch member is mounted on said gear wheel to extend radially from the centre of said gear wheel, one of said contacts being in permanent contact with said switch member at the centre of said gear wheel and the second of said contacts being adapted to contact a radially outer portion of said switch member.

* * * * *